United States Patent [19]

Whatley

[11] Patent Number: 4,901,508
[45] Date of Patent: Feb. 20, 1990

[54] FENCE ROW MOWER

[76] Inventor: Douglas L. Whatley, Rte. 1, Box 44A, Paoli, Okla. 73074

[21] Appl. No.: 217,490

[22] Filed: Jul. 11, 1988

Related U.S. Application Data

[63] Continuation-in-part of Ser. No. 109,026, Oct. 16, 1987, abandoned.

[51] Int. Cl.$^4$ .................. A010 38/86; A010 34/66
[52] U.S. Cl. ......................... 56/10.4; 56/15.5; 56/15.2; 56/235
[58] Field of Search .......... 56/10.4, 15.2, 15.5, 56/10.7, 15.9, 15.3, 14.9, 15.1, 235; 172/98, 99

[56] References Cited

U.S. PATENT DOCUMENTS

| | | | |
|---|---|---|---|
| 2,838,901 | 6/1958 | Davis | 56/10.4 |
| 3,059,704 | 10/1962 | Kasatkin | 172/99 |
| 3,274,762 | 9/1966 | Tolls | 56/15.2 |
| 3,715,872 | 2/1973 | Thompson, Jr. | 56/10.4 |
| 3,750,376 | 8/1973 | Cioni | 56/10.4 |
| 3,949,539 | 4/1976 | Cartner | 56/10.4 |
| 4,426,829 | 1/1984 | Johnson | 56/10.4 |
| 4,697,405 | 10/1987 | DeWitt | |

Primary Examiner—John Weiss
Attorney, Agent, or Firm—Robert K. Rhea

[57] ABSTRACT

A mower for mowing vegetation under a fence supported above the surface of the earth by a series of spaced posts comprising a horizontal boom connected at one end with a prime mover and supporting a mowing head at its other end. The mowing head is pivotal about a vertical and horizontal axes so that when contacting one of the fence posts the mowing head pivots around the position of the post while drawn by the prime mover in a forward direction. The mowing head is angularly tilted vertically for mowing a fence row or other surface on an incline with respect to the surface of the earth supporting the prime mover.

5 Claims, 2 Drawing Sheets

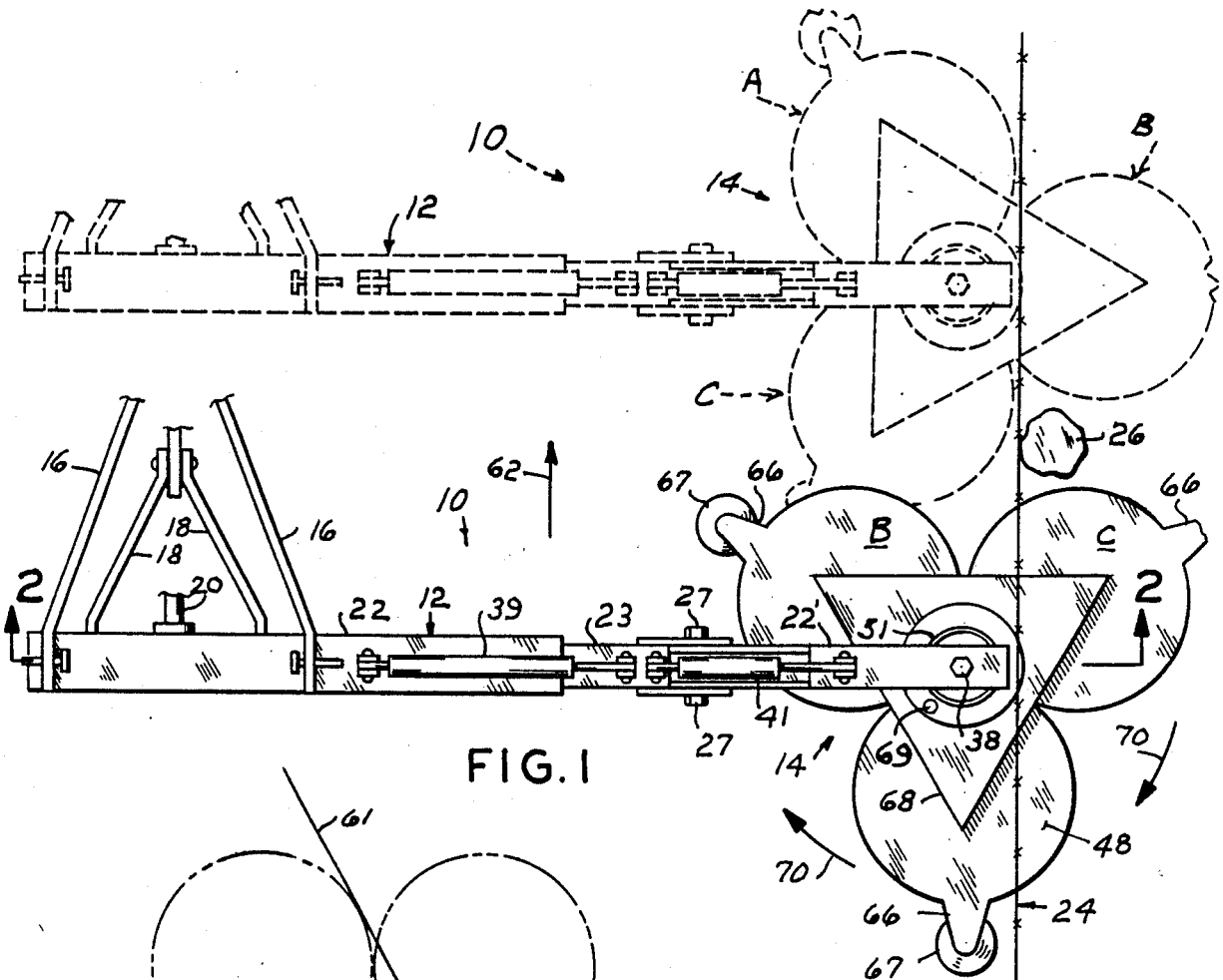
FIG. 1
FIG. 3
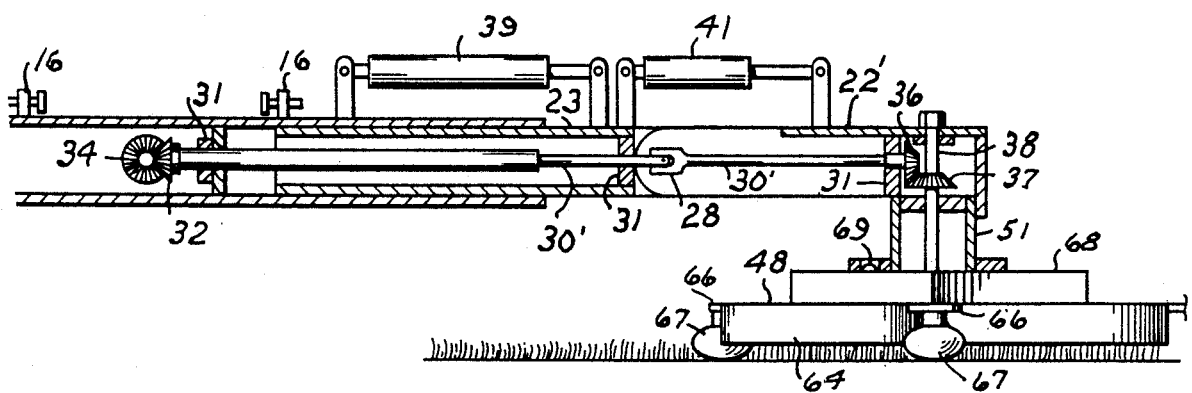
FIG. 2

FENCE ROW MOWER

This application is a continuation-in-part of a U.S. application for patent filed by me on Oct. 16, 1987 under Ser. No. 07/109,026 for FENCE ROW MOWER abandoned 11-22-88.

BACKGROUND OF THE INVENTION

1. Field of the Invention

The present invention relates to vegetation mowers and more particularly to a mower for cutting vegetation under a fence row.

2. Description of the Prior Art

The most pertinent patent is believed to be U.S. Pat. No. 4,697,405 which discloses a multiblade cutting head supported by a tractor towed trailer moving along and guided by a guard rail for mowing thereunder. Telescoping and pivoting arms, extending above and beyond the upper limit of the guard rail, support a mowing head rotatable about a vertical axis when encountering a guard rail post.

This invention is distinctive over the above named patent by mounting a plurality of horizontally rotating mower blades on a boom in a manner which utilizes all blades in a cutting action on level and inclined surfaces and in which belt and pulley blade driving means permit the mower head to extend from a prime mover under the adjacent side of a fence and pass around a stationary object.

SUMMARY OF THE INVENTION

A mower head formed by a plurality of horizontally rotating mower blades, each mounted on a vertical stub axle, are journalled by bearings on a horizontal plate overlying all mower blades. The mower blades are arranged in a circular array in which the peripheral paths of the blades overlap in any horizontal direction of movement. The blade supporting plate is provided with indentations inducing its rotation about its central axis when moved along a fence row and contacting a fence post. Belt and pulley means connect the blade axles, as a unit, with a vertical drive spindle in turn driven by a boom supported drive shaft driven by a prime mover. The boom may be telescopically extended and is pivotally hinged horizontally intermediate its ends for a vertical tilting action of the mower head when mowing a fence row on a plane surface inclined with respect to the plane of a surface supporting the prime mover.

The principal object of the invention is to provide a tractor supported and driven mower head for cutting vegetation under and beyond a fence row of the type supported above the surface of the earth by a plurality of posts spaced along the fence line and in which the mower head is free to rotate angularly about a central vertical axis in a mowing around-a-post action when contacted by the support plate of the mower head during forward movement with the tractor and in which the mower head may be vertically tilted to be parallel with a surface inclined with respect to the longitudinal axis of its driving boom for mowing highway right-of-way bar ditch areas, or the like.

BRIEF DESCRIPTION OF THE DRAWINGS

FIG. 1 is a fragmentary top view of the mower head illustrating, by dotted lines, the rotating around a post action of the mower head;

FIG. 2 is a vertical cross sectional view taken substantially along the line 2—2 of FIG. 1;

FIG. 3 is a diagram illustrating the mower blades overlapping cutting path;

DESCRIPTION OF THE PREFERRED EMBODIMENTS

Figure 6:
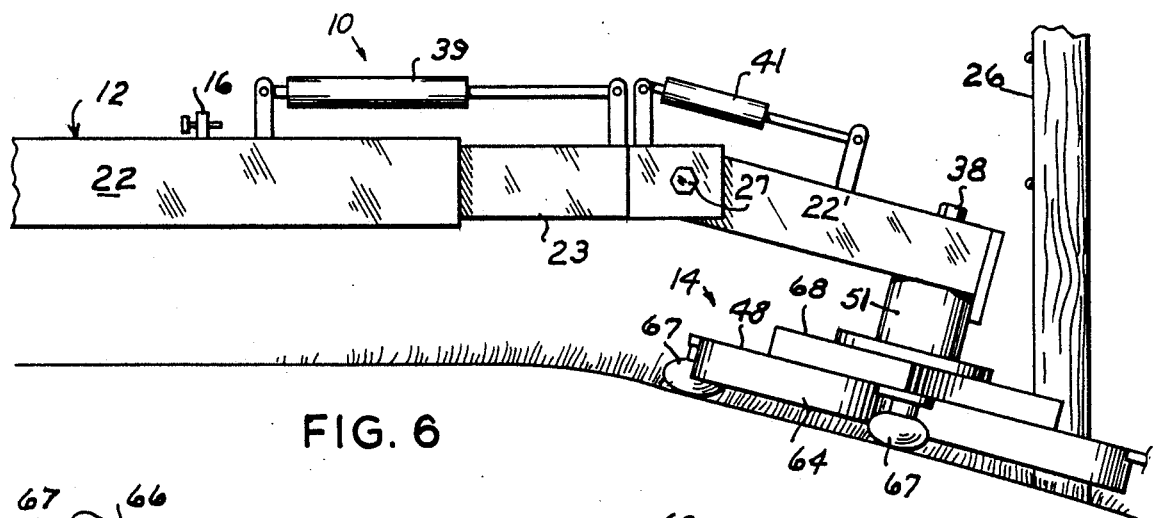
Figure 4:
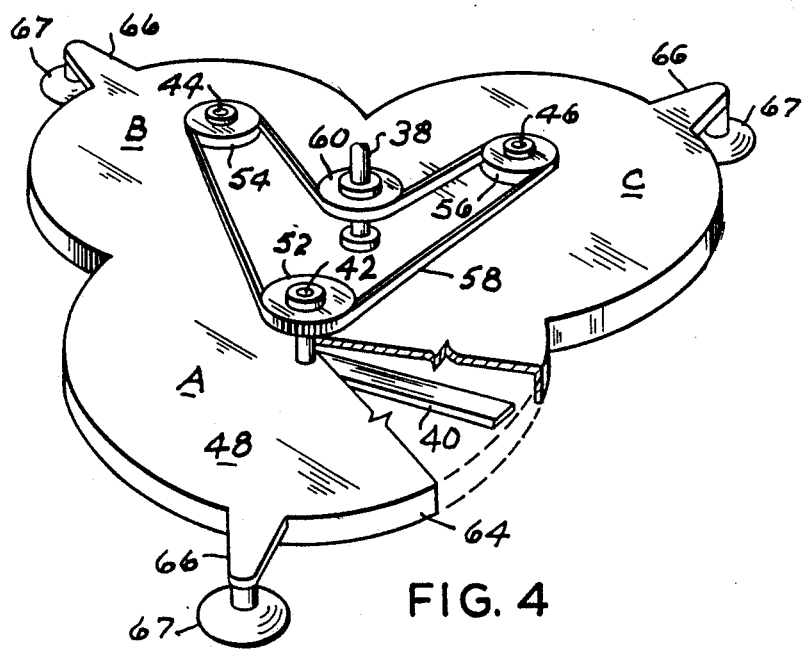
FIG. 4 is a fragmentary perspective view of the mower head with its pulley and belt shield removed for clarity; and, FIGS. 5 and 6 are fragmentary elevational views illustrating the relative positions of the mower head when inclined with respect to its driving and supporting boom.

Like characters of reference designate like parts in those figures of the drawings in which they occur.

In the drawings:

The reference numeral 10 indicates the mower assembly, as a whole, comprising an elongated boom means 12 extending in one direction laterally of a tractor, not shown, and having a cutting head assembly 14 depending from one end thereof. The other end of the boom means 12 is pin connected in a substantially conventional manner with tractor tow bars 16—16. Tractor lift arms 18—18 are also connected with the tow bar connected end portion of the boom means. The tractor power take-off, indicated at 20, drives the cutters of the cutting head 14, as presently described.

The boom means 12 comprises an elongated outer tubular member 22 and an inner telescoping member 23, of any desired transverse cross sectional configuration, having a length sufficient to dispose a portion of the cutting head 14 under and beyond the vertical plane defined by a fence row 24. The fence 24 is spaced above the surface of the earth by a plurality of spaced posts 26, only one being shown. The boom means inner tube 23 is transversely divided and forms a longitudinal extension 22' hingedly connected with the inner tube 23, as at 27, for the purposes presently explained.

A drive shaft 30 and its splined telescoping insert 30' (FIG. 2) is journalled by bearings 31 and extends longitudinally through one end of the boom 22 and is provided at its driven end with a right angle gear 32 meshing with a companion right angle drive gear 34 on the tractor power drive shaft 20. A universal joint 28 is interposed in the drive shaft insert 30' at the boom hinge position 27 for the reasons presently believed obvious. The other end of the drive shaft 30' is similarly provided with a right angle gear 36 meshing with a companion gear 37 mounted on the hinge pin or mower head spindle 38 which drives the cutting head assembly 14, as presently explained. Obviously other standard drive units, not shown, may be employed in place of the angle gears.

Boom extension is accomplished by a first hydraulic cylinder 39 having one end portion secured to the boom outer tube 22 and its other end mounted on the boom telescoping inner tube 23. Similarly, a second hydraulic cylinder 41, mounted on the boom inner tube 23 and its extension 22', respectively, maintains the plane of the cutting head assembly parallel with the longitudinal axis of the boom tubes 22 and 23 or vertically tilts the cutting head assembly about the horizontal axis 27, as presently explained.

The cutting head assembly 14 comprises a plurality, three in the example shown, of horizontal rotary blade units commonly called "rotary mowers", as indicated at A, B and C. Each of the rotary mowers comprises a cutting blade 40, only one being shown, mounted on vertically disposed driven shafts 42, 44 and 46 projecting through a common supporting plate 48 and journalled by bearings, not shown, mounted thereon. The plate 48 is centrally mounted on the depending end of the drive shaft or spindle 38, journalled by a bearing 50, connected with the end of the boom opposite its tractor connection by a flanged sleeve 51. The plate 48 is rotatable independently of the spindle 38 in response to contact with a stationary object but is preferably subsequentially indexed to a predetermined position as presently explained.

Pulleys 52, 54 and 56, mounted on the respective blade drive shaft above the plate 48, are driven by an endless belt 58 entrained therearound and driven by a spindle drive pulley 60 axially secured to the spindle 38.

The blade drive shafts 42-46 are positioned in 120° circumferential spaced relation on the plate 48 about the vertical axis of the spindle 38.

The periphery of the rotary mower supporting plate 48 is provided with arcuate indentations or cusps defining the respective perimeter of the three rotary mowers A, B and C when viewed from above wherein the circular paths, defined by the ends of the respective rotating blades 40, are substantially tangent to each other. As illustrated by FIG. 3, a line 61 tangent with the peripheral cutting limit of two blades subtends an arc of substantially 75° to overly the mower head 14, and insures an interrupted vegetation cutting path, regardless of the circular orientation of the rotary mowers A, B and C, when the mower head 14 is moved by the tractor in the direction of the arrows 62.

Additionally, the perimeter of the plate 48 is provided with a depending guard wall or skirt 64. At its circumferential outermost positions, the plate 48 is radially provided with spacing means formed by stub arms 66, each having an arcuate pressure pad 67 depending therefrom for maintaining the respective blade 40 spaced above the surface of the earth when mowing an irregular surface. A belt and pulley triangular inverted cup-shape guard 68 centrally surrounds the spindle 38 below the outstanding flange of the sleeve 51 and in overlying relation with respect to the belt and pulleys driving the blades 40. The top portion of the guard 68 supports a spring urged pin 69 nested by an aperture in the sleeve flange (FIG. 2).

OPERATION

In the operation of the device 10, assuming it is being moved by a tractor in a forward direction along the fence row 24 and that the axis of the cutter driving spindle 38 does not extend beyond the vertical plane of the fence row 24. The major portion of at least one of the rotary mowers A, B or C will be disposed beyond the fence row 24. When the cutting head section C contacts the post 26, as in FIG. 1, the cutting head assembly 14 rotates as a unit in the direction of the arrows 70 about the axis of the spindle 38 so that as the cutting head assembly 14 passes the post 26 in a roll-around action the rotary mowers will be disposed, as illustrated by dotted lines (FIG. 1), without interruption of the forward movement of the cutting head assembly. Thereafter rotational torque applied to the cutting head 14, by the blades 40 and/or the frictional contact between the pressure pads 67 and the surface of the earth, continues angular rotation of the cutting head about the spindle 38 until indexed by the pin 69.

Figure 5:
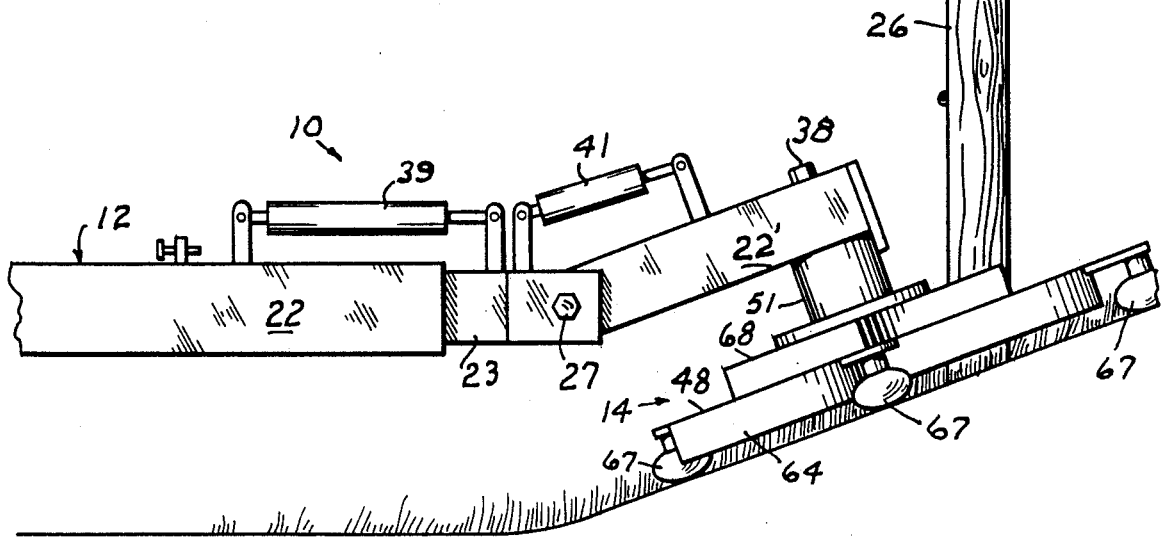

When the surface under a fence row to be mowed is on an incline with respect to the earth's surface supporting the prime mover, the boom inner tube 23 is extended sufficiently to position the cutting head 14 under the plane of the fence row. The pressure cylinder 41 piston is retracted to lift the cutting head 14 as a unit in a vertical pivoting movement about the horizontal hinge axis 27 so that the blade guard 64 is parallel with the surface of the earth whether inclined upwardly or downwardly with respect to the tractor supported position, as illustrated, respectively, in FIGS. 5 and 6. Thereafter the cutting head operates substantially as described hereinabove.

Obviously the invention is susceptible to changes or alterations without defeating its practicability. Therefore, I do not wish to be confined to the preferred embodiment shown in the drawings and described herein.

I claim:

1. A mower supported and driven by a prime mover for mowing beneath and beyond both sides of the vertical plane of a fence supported by a plurality of fence posts, comprising:

elongated horizontal boom means including inner and outer telescoping tubular members connected at one end with and projecting laterally beyond one side of said prime mover parallel with the surface of the earth;

an elongated boom extension hingedly connected at one end with the end of said inner tubular member opposite said prime mover for vertical pivoting movement of its other end portion;

driven shaft means including a driven spindle vertically journalled by said other end portion of said boom extension;

drive shaft means drivably connecting said prime mover with said driven spindle means for angular rotation of the latter;

a universal joint interposed in the drive shaft means at the boom extension hingedly connected position;

platform means including a normally horizontal generally circular planar sheet having a plurality of circumferentially equally spaced peripheral indentations journalled by the depending end of said drive spindle in a manner permitting angular rotation of the platform means independently of the angular rotation of said driven spindle in response to contact of a peripheral portion of the platform sheet with a stationary object;

means carried by the boom means for vertically tilting the platform sheet about a horizontal axis through an arcuate angle with respect to the longitudinal axis of the boom means for mowing vegetation on a surface inclined with respect to the horizontal;

a plurality of angularly rotating vegetation cutting blades journalled in a circular array by said platform means;

belt and pulley means drivably connecting said cutting blades with said driven spindle;

an inverted cup-like belt and pulley guard overlying said platform sheet and angularly rotatable therewith; and, a bearing support sleeve depending from said boom extension and axially surrounding said driven spindle, said sleeve having an outstanding annular flange overlying said belt and pulley guard.

2. The mower according to claim 1 in which said cutting blades angularly rotate horizontally about a like plurality of vertical axes spaced 120°.

3. The mower according to claim 2 in which said boom means further includes:

first pressure cylinder means for extending and retracting one said tubular member relative to the other.

4. The mower according to claim 3 in which said boom tilting means further includes:

second pressure cylinder means connected with the boom extension for vertical pivoting movement about a horizontal axis of the platform means through an acute angle with respect to the longitudinal axis of the boom means outer tubular member.

5. The mower according to claim 4 and further including:

spacing means including a plurality of circular pressure pads each having a depending arcuate surface rigidly connected with and depending from said platform for normally preventing contact between said cutting blades and the surface of the earth.

* * * * *